(12) United States Patent
Angold (10) Patent No.: US 9,333,644 B2
(45) Date of Patent: May 10, 2016

(54) PORTABLE LOAD LIFTING SYSTEM

(75) Inventor: Russdon Angold, American Canyon, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 1397 days.

(21) Appl. No.: 13/084,265

(22) Filed: Apr. 11, 2011

(65) Prior Publication Data

US 2011/0264014 A1    Oct. 27, 2011

Related U.S. Application Data

(60) Provisional application No. 61/322,684, filed on Apr. 9, 2010.

(51) Int. Cl.
*B66D 3/18* (2006.01)
*B25J 9/00* (2006.01)

(52) U.S. Cl.
CPC ........ *B25J 9/0006* (2013.01); *B66D 3/18* (2013.01)

(58) Field of Classification Search
CPC ........ A61F 5/0102; B25J 9/0006; B66D 3/18; B66D 3/20
See application file for complete search history.

(56) References Cited

U.S. PATENT DOCUMENTS

| | | | |
|---|---|---|---|
| 2,010,482 A * | 8/1935 | Cobb | A61F 5/0102 446/377 |
| 3,964,182 A * | 6/1976 | Pomeret | E02F 3/02 172/41 |
| 4,258,556 A | 3/1981 | Ruyten et al. | |
| 5,016,869 A * | 5/1991 | Dick | B25J 9/0006 482/51 |
| 5,020,790 A * | 6/1991 | Beard | A61H 3/00 482/4 |
| 5,865,426 A * | 2/1999 | Kazerooni | B66D 3/18 212/285 |
| 5,993,404 A | 11/1999 | McNiel | |
| 6,886,812 B2 | 5/2005 | Kazerooni | |

(Continued)

FOREIGN PATENT DOCUMENTS

| JP | H03105191 U | 10/1991 |
|---|---|---|
| JP | 3024978 U | 6/1996 |

(Continued)

OTHER PUBLICATIONS

International Search Report for PCT/US2011/031956, mailed Jun. 21, 2011, 2 pages.

(Continued)

*Primary Examiner* — Lee D Wilson
*Assistant Examiner* — Tyrone V Hall, Jr.
(74) *Attorney, Agent, or Firm* — Withrow & Terranova, PLLC (57) ABSTRACT

A portable load lifting assist system (100) includes a movable support structure including an exoskeleton torso (160) including an exoskeleton trunk (109) that is configured to be coupled to a person's upper body, and a load lifting mechanism (221) secured to the movable support structure including a winch (229) having a motor driven reel mechanism for reeling first and second lifting straps or cables (222) that are secured to first and second end effectors (223). First and second handles (224) are attached to an outside surface of the first and second end effectors, wherein the lifting straps or cables when driven by the winch lift a load contacted by the first and second end effectors. A lower extremity exoskeleton (120) is configured to be coupled to a person's lower limbs. The exoskeleton trunk couples to the person's upper body through an upper body interface device (150) that is coupled to the lower extremity exoskeleton.

21 Claims, 8 Drawing Sheets

(56) References Cited

U.S. PATENT DOCUMENTS

| | | | |
|---|---|---|---|
| 6,913,583 B2 | 7/2005 | Jestrabek-Hart | |
| 7,153,242 B2 | 12/2006 | Goffer | |
| 7,163,518 B1 | 1/2007 | Roche et al. | |
| 7,571,839 B2 | 8/2009 | Chu et al. | |
| 7,628,766 B1* | 12/2009 | Kazerooni | A61F 5/00 601/35 |
| 7,883,546 B2 | 2/2011 | Kazerooni et al. | |
| 7,947,004 B2 | 5/2011 | Kazerooni et al. | |
| 8,057,410 B2 | 11/2011 | Angold et al. | |
| 8,070,700 B2 | 12/2011 | Kazerooni et al. | |
| 8,171,570 B2 | 5/2012 | Adarraga | |
| 8,231,688 B2 | 7/2012 | Fairbanks et al. | |
| 8,257,291 B2 | 9/2012 | Kazerooni et al. | |
| 8,394,038 B2 | 3/2013 | Ashihara et al. | |
| 8,672,865 B2 | 3/2014 | Franke et al. | |
| 8,702,632 B2 | 4/2014 | Han et al. | |
| 8,801,641 B2 | 8/2014 | Kazerooni et al. | |
| 8,894,592 B2 | 11/2014 | Amundson et al. | |
| 8,945,028 B2 | 2/2015 | Kazerooni et al. | |
| 8,968,222 B2 | 3/2015 | Kazerooni et al. | |
| 9,011,354 B2 | 4/2015 | Angold et al. | |
| 2003/0073552 A1 | 4/2003 | Knight | |
| 2003/0109817 A1 | 6/2003 | Berl | |
| 2003/0115954 A1 | 6/2003 | Zemlyakov et al. | |
| 2005/0137717 A1 | 6/2005 | Gramnas et al. | |
| 2006/0064047 A1* | 3/2006 | Shimada | A61F 5/0102 602/23 |
| 2006/0260620 A1 | 11/2006 | Kazerooni et al. | |
| 2007/0056592 A1 | 3/2007 | Angold et al. | |
| 2007/0123997 A1 | 5/2007 | Herr et al. | |
| 2007/0233279 A1 | 10/2007 | Kazerooni et al. | |
| 2009/0210093 A1* | 8/2009 | Jacobsen | A61H 3/008 700/260 |
| 2009/0292369 A1 | 11/2009 | Kazerooni et al. | |
| 2010/0094185 A1 | 4/2010 | Amundson et al. | |
| 2011/0040216 A1 | 2/2011 | Herr et al. | |
| 2011/0105966 A1 | 5/2011 | Kazerooni et al. | |
| 2011/0166489 A1 | 7/2011 | Angold et al. | |
| 2011/0214524 A1* | 9/2011 | Jacobsen | A61F 2/68 74/490.04 |
| 2011/0266323 A1 | 11/2011 | Kazerooni et al. | |
| 2012/0172770 A1 | 7/2012 | Almesfer et al. | |
| 2012/0283845 A1 | 11/2012 | Herr et al. | |
| 2013/0023800 A1 | 1/2013 | Bédard et al. | |
| 2013/0102935 A1 | 4/2013 | Kazerooni et al. | |
| 2013/0150980 A1 | 6/2013 | Swift et al. | |
| 2013/0197408 A1 | 8/2013 | Goldfarb et al. | |
| 2013/0231595 A1 | 9/2013 | Zoss et al. | |
| 2013/0237884 A1 | 9/2013 | Kazerooni et al. | |
| 2013/0296746 A1 | 11/2013 | Herr et al. | |
| 2013/0303950 A1 | 11/2013 | Angold et al. | |
| 2014/0046234 A1 | 2/2014 | DeSousa | |
| 2014/0200491 A1 | 7/2014 | Julin et al. | |
| 2015/0001269 A1 | 1/2015 | Sacksteder | |

FOREIGN PATENT DOCUMENTS

| | | |
|---|---|---|
| JP | 2003104682 A | 4/2003 |
| JP | 200911818 A | 1/2009 |
| WO | 2012154580 A1 | 11/2012 |

OTHER PUBLICATIONS

Notice of Reasons for Refusal for Japanese Patent Application No. 2013-504019, mailed Feb. 24, 2015, 6 pages.

Extended European Search Report for European Patent Application No. 11766862.4 mailed May 27, 2014, 4 pages.

Whitwam, Ryan, et al., "Banks now have money-grabbing robotic exoskeletons that are probably helpful for robbing banks," PCMag Digital Group, May 9, 2015, Ziff Davis, LLC, www.geek.com/?s=japanese+banks+now+have+money+grabbing&x=0&y=0, 4 pages.

International Preliminary Report on Patentability for PCT/US2011/031956, issued Oct. 9, 2012, 6 pages.

Notice of Reasons for Refusal for Japanese Patent Application No. 2013-504019, mailed Dec. 22, 2015, 6 pages.

* cited by examiner

PORTABLE LOAD LIFTING SYSTEM

CROSS REFERENCE TO RELATED APPLICATIONS

This application claims the benefit of Provisional Application Ser. No. 61/322,684 entitled "PORTABLE LOAD LIFTING ASSIST MECHANISM", filed Apr. 9, 2010, which is herein incorporated by reference in its entirety.

U.S. GOVERNMENT RIGHTS

The U.S. Government has certain rights to disclosed embodiments based on a contract between Lockheed Martin Corporation and the U.S. Army Natick Soldier Research Development and Engineering Center (NSRDEC).

FIELD

Disclosed embodiments relate to portable load lifting systems.

BACKGROUND

Certain jobs require individuals to repetitively lift and carry heavy loads. These activities significantly increase muscular-skeletal stress on the body, potentially leading to injuries, with some injuries potentially being permanent injuries.

One known load lifting assist system utilizes an exoskeleton which incorporates fully articulated arms to allow for upper body lift assist. These arms have a similar range of motion to the user's arms and require significant sensing and actuation to ensure the system tracks the user to avoid any discomfort. Additionally, loads can be carried by utilizing a fixed load attachment which supports the load on the user, but prohibits raising or lowering the load from the fixed attachment point.

Another known lifting assist system has a fixed load assist mechanism that is built into the infrastructure of a warehouse or other facility. Typically the lift assist mechanism in this system is permanently attached to a fixed overhead gantry. This arrangement is thus limited to use within a limited region of the warehouse or other facility.

SUMMARY

Disclosed embodiments include portable load lifting systems that provide powered assisted straps or cables coupled to end-effectors for lifting and carrying or moving heavy loads. In one embodiment, the portable load lifting system is a load lifting assist system that can be worn by a human user to transfer the weight of the load through the frame of the load lifting assist system to the ground or other lower surface (e.g., a floor). In this embodiment, loads attached to the load lifting assist system are carried by the exoskeleton, significantly reducing the load on the user, thus reducing the risk of muscular skeletal injuries and allowing more weight to be carried by the user.

Other embodiments disclosed herein include portable load lifting assist systems that are independent of a lower extremity exoskeleton. For example, the portable load lifting assist system can be worn like a backpack (e.g., secured by straps to a torso of a user). In another embodiment the portable load lifting system is operable without the need to be secured to a human user, such including a mobile unit (e.g., a cart on wheels) that provides the system its support and portability.

Additionally, disclosed embodiments include portable load lifting assist systems that include structures that allow users to raise loads up to a minimum of shoulder height while still providing lift assistance. The power-assisted straps or cables enable a user to safely accomplish tasks that would typically require two or more personnel to carry the load. The end-effectors are quickly and easily exchanged to enable lift and carriage of many different items such as boxes, containers or munitions. Disclosed portable load lifting assist system embodiments allow for the normal lifting range of motion of a person, and through the use of disclosed shoulder lifting devices, allows the user to raise loads to shoulder height and above while still providing significant lift assistance.

Cantilevered weight can be used to keep the center of gravity close to the user to maintain balance and positive control of the load. Force sensors within the end-effectors can feed an onboard microprocessor-based controller to ensure system movement in concert with the user enabling accurate placement of objects that are lifted by the user. By detecting the force input by the user such as by including force sensors on the end effectors allows disclosed portable load lifting assist systems to also able to detect the user's intent (raise, lower or stabilize) and to provide the appropriate assistance to implement the user's intent via the lifting straps or cables attached to the end-effectors.

DETAILED DESCRIPTION

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Disclosed portable load lifting systems comprise a movable support structure and a load lifting mechanism secured to the movable support structure comprising a winch including a motor driven reel mechanism for reeling first and second lifting straps or cables that are secured to first and second end effectors. First and second handles are attached to an outside surface of the first and second end effectors, where the lifting straps or cables when driven by the winch lift a load contacted by the first and second end effectors. The portable load lifting system can comprise a load lifting assist system for aiding a human user that includes a lower extremity exoskeleton and an exoskeleton torso, or can be embodied in other disclosed embodiments to include an exoskeleton torso but not a lower extremity exoskeleton. Other disclosed embodiments comprise load lifting systems that are operable without the need to be secured to a human user.

Figure 1:
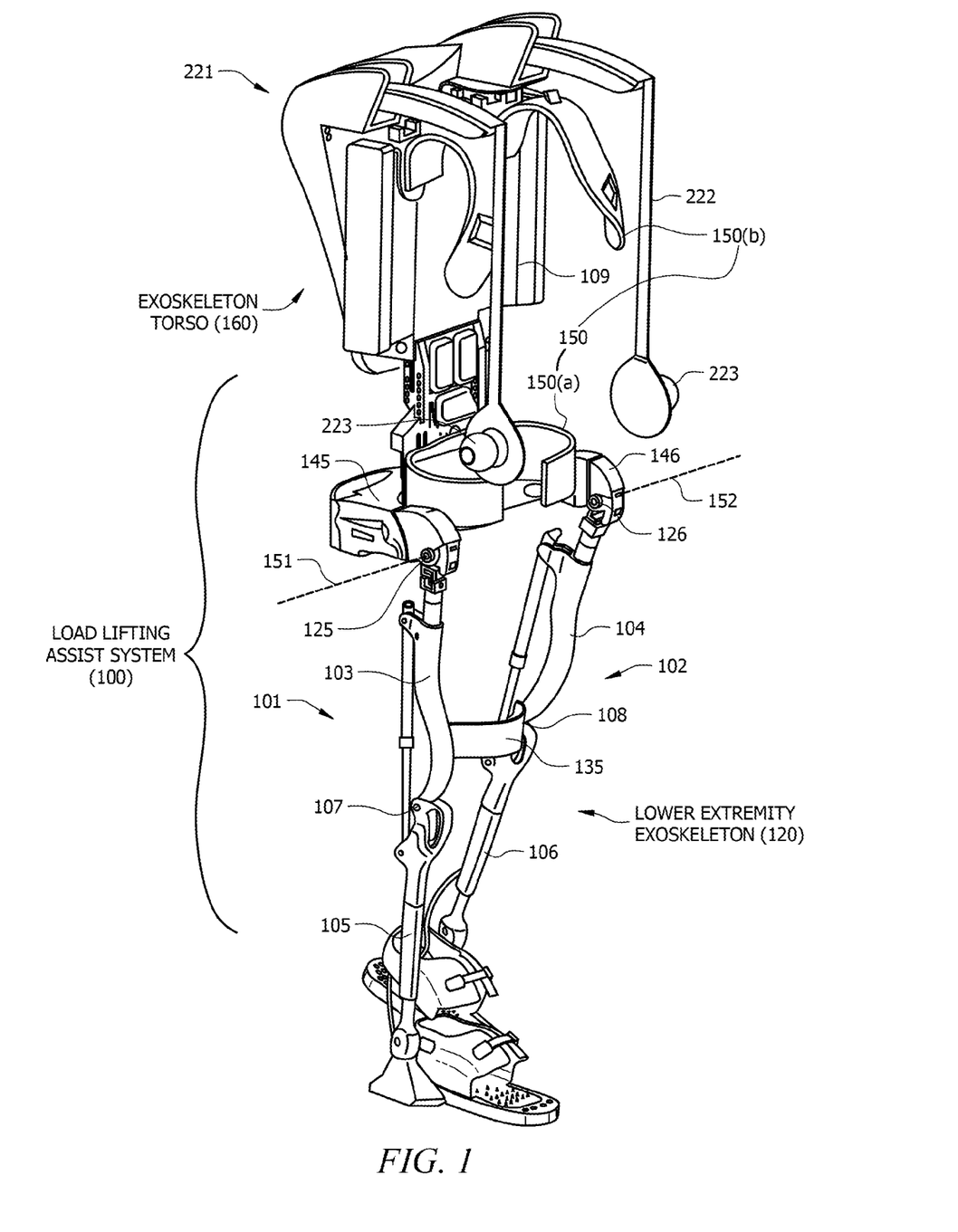
FIG. 1 is a front view perspective drawing of an example portable load lifting assist system for aiding a human user comprising a lower extremity exoskeleton and exoskeleton torso, according to a disclosed embodiment.

In accordance with an example embodiment, FIG. 1 is a front view perspective drawing illustrating an example portable load lifting assist system 100 for aiding a human user comprising a lower extremity exoskeleton 120 and exoskeleton torso 160 including an exoskeleton trunk 109. Portable load lifting assist system 100 is wearable by a person and allows its wearer to carry a load in his/her front, and aid the person when lifting an object by significantly reducing the load on the user. For example, portable load lifting assist system 100 can be used to help lift heavy loads while exerting minimal effort, such as in an example military application for soldiers going into combat with up to 130 pounds of combat gear.

Lower extremity exoskeleton 120, in addition to other components, includes two leg supports, 101 and 102, which are configured to be coupled to person's lower limbs and configured to rest on the ground or other surface (e.g., a floor) during their stance phase. The leg supports 101 and 102, in addition to other components, include thigh links 103 and 104, and shank links 105 and 106. Two knee joints, 107 and 108, are configured to allow flexion and extension between the shank links 105 and 106 and the thigh links 103 and 104 of the leg supports 101, 102 during the corresponding leg support swing phase. However, the two knee joints 107 and 108 in some embodiments are configured to resist flexion between the shank links 105 and 106 and the thigh links 103 and 104 of the leg supports 101, 102 during the corresponding leg support stance phase.

Exoskeleton torso 160, among other components, comprises an exoskeleton trunk 109. Exoskeleton trunk 109, among other components, comprises an upper body interface device 150. Exoskeleton trunk 109 is configurable to be coupled to the person's upper body through the upper body interface device 150. As used herein, a person's upper body refers to any location generally above the thighs including the buttocks of the person. Examples of upper body interface devices 150 comprise an element or combination of elements including, without limitation, vests, belts, straps, shoulder straps, chest straps, body cast, harness, and waist belts.

Exoskeleton trunk 109 is rotatably connectable to leg supports 101 and 102 at hip flexion-extension joints 125 and 126, allowing for the hip flexion and extension rotations of leg supports 101 and 102 about hip flexion-extension axes 151 and 152 respectively. Leg supports 101 and 102 are configurable to be coupled to person's lower limbs through lower limb interface straps, with the lower right interface strap 135 shown in FIG. 1 (left lower limb interface strap not shown in FIG. 1 for clarity).

In some embodiments such as shown in FIG. 1, the respective lower limb interface straps are coupled to thigh links 103 and 104. In some embodiments, lower limb interface straps are coupled to shank links 105 and 106. In some other embodiments, lower limb interface straps are coupled to both the shank links and thigh links. Each lower limb interface strap can comprise an element or combination of elements including, without limitation, straps, bars, c-shaped brackets, body cast, and elastomers.

In operation, a person is coupled to (or wears) load lifting assist system 100 including exoskeleton torso 160 through upper body interface device 150 (a simple belt 150(a) and shoulder straps 150(b) shown in FIG. 1) and lower extremity exoskeleton 120 by coupling to two leg supports 101 and 102 through lower limb interface straps 135 and 136. In some embodiments, lower extremity exoskeleton 120 among other things, may include two hip torque generators 145 and 146 which are configured to create torques between exoskeleton trunk 109 and leg supports 101 and 102.

The exoskeleton torso 160 shown in FIG. 1 also includes a load lifting mechanism 221. The load lifting mechanism 221 in FIG. 1 has within it a winch 229 (see FIG. 3) which includes a reel mechanism which can reel in straps or lifting cables 222 that in one particular embodiment are nylon straps in order to lift a load connected to or contacted by end effectors 223.

Disclosed portable load lifting systems include a power source (not shown) that can comprise a battery source, or other power sources such as fuel cell-based power sources. Disclosed portable load lifting assist systems such as portable load lifting assist system 100 shown in FIG. 1 are also easy for a user to put on. The portable load lifting assist system 100 can arrive folded in a small package, so that soldiers or other users simply stretch out a leg and step into foot beds underneath the boot. Straps can then wrap around the thighs, waist and shoulders of the soldier or other user.

Figure 2:
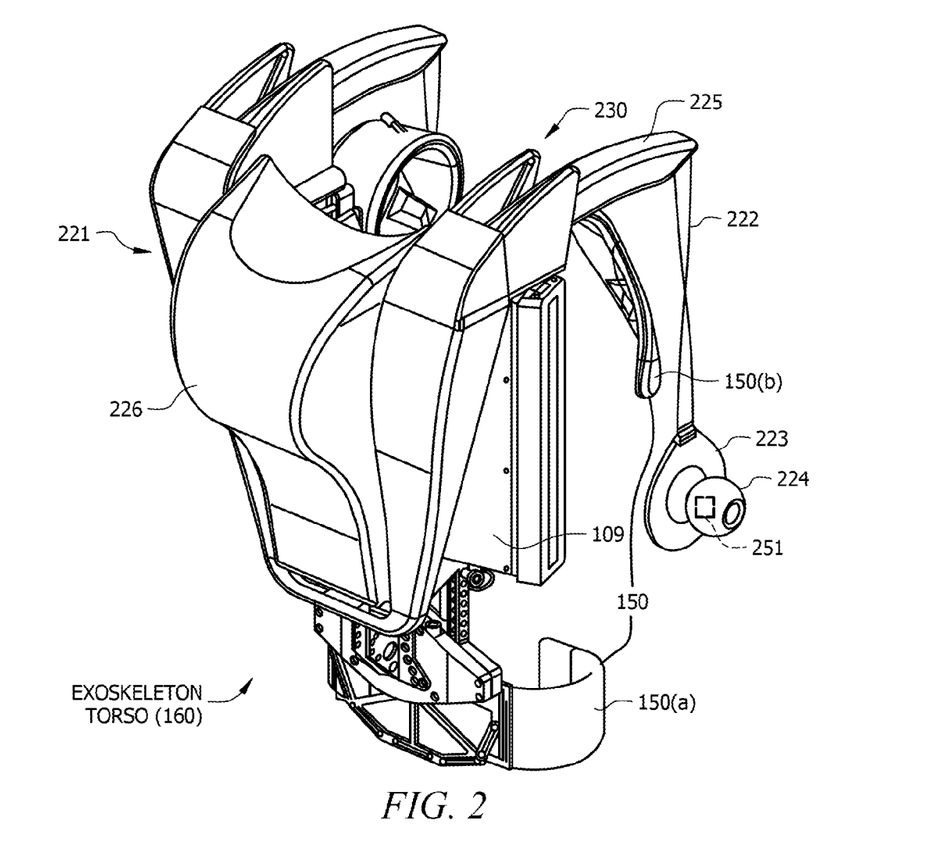
FIG. 2 shows an example exoskeleton torso including the exoskeleton trunk with a load lifting mechanism connected to it, according to a disclosed embodiment.

FIG. 2 shows an example exoskeleton torso 160 including the exoskeleton trunk 109 with a load lifting mechanism 221 connected to it, according to a disclosed embodiment. In FIG. 2, end effector 223 is shown as a simple paddle on which a high friction material is mounted on the side opposite handle 224. The high friction material is used to help grip the sides of boxes and box like objects. One particular example of an example high friction material is "GECKO SKIN." However, end effector 223 may generally be any item used to lift a load and may contain a force sensor 251 in the handle 224 in order to measure the load force which the human user is putting on the handle. Item 225 is a lifting bar which (among other things) acts as a guide for cable 222. In one embodiment the load lifting mechanism 221 (including the internal winch, straps 222, end effectors 223, and handles 224) can be a mechanism sometimes referred to as a "human power amplifier." An example of such a "human power amplifier" is disclosed in U.S. Pat. No. 6,886,812 to Kazerooni.

Figure 3:
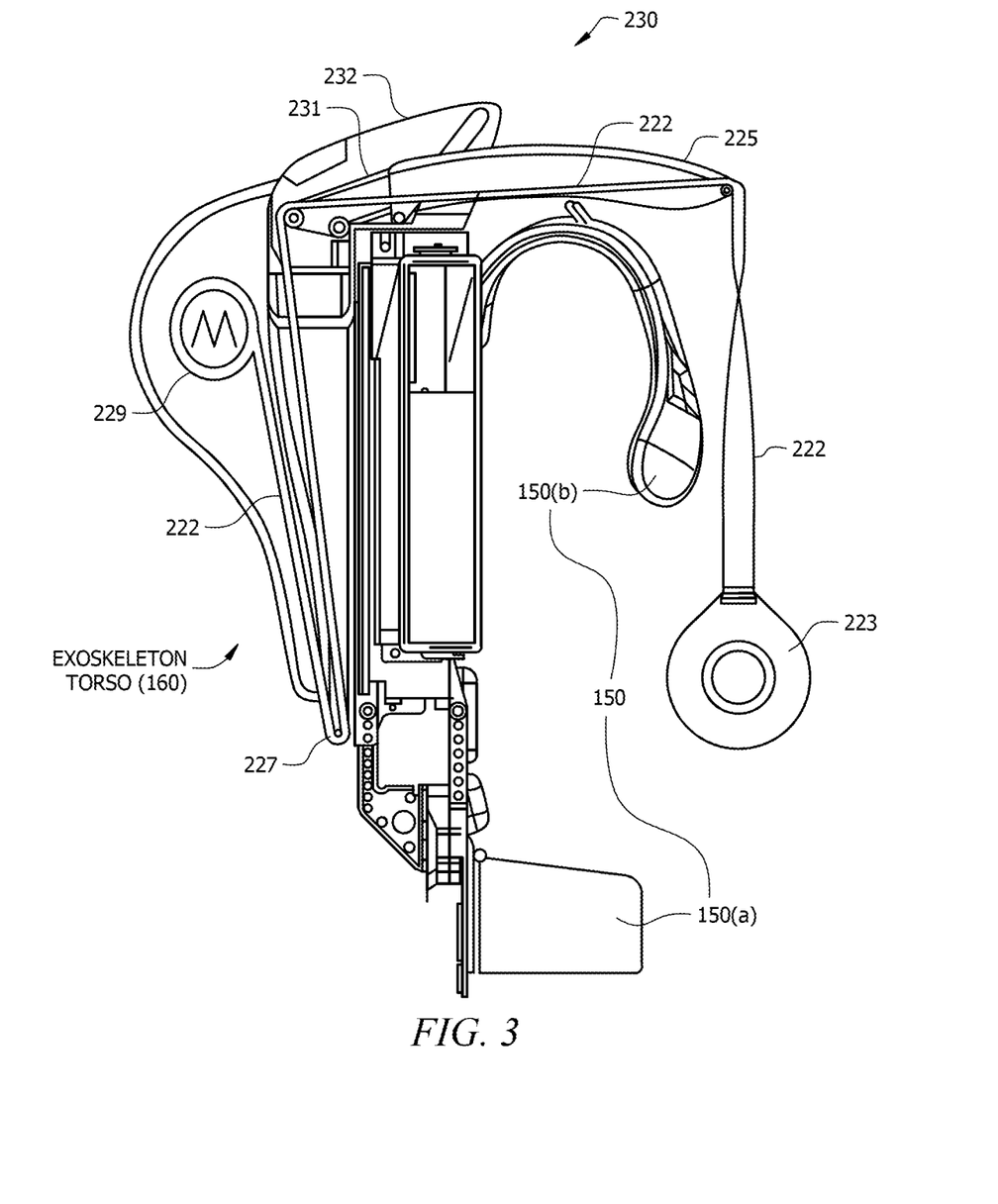
FIG. 3 depicts a partial cross section depiction of an example load lifting bar mechanism, according to a disclosed embodiment.
Figure 4:
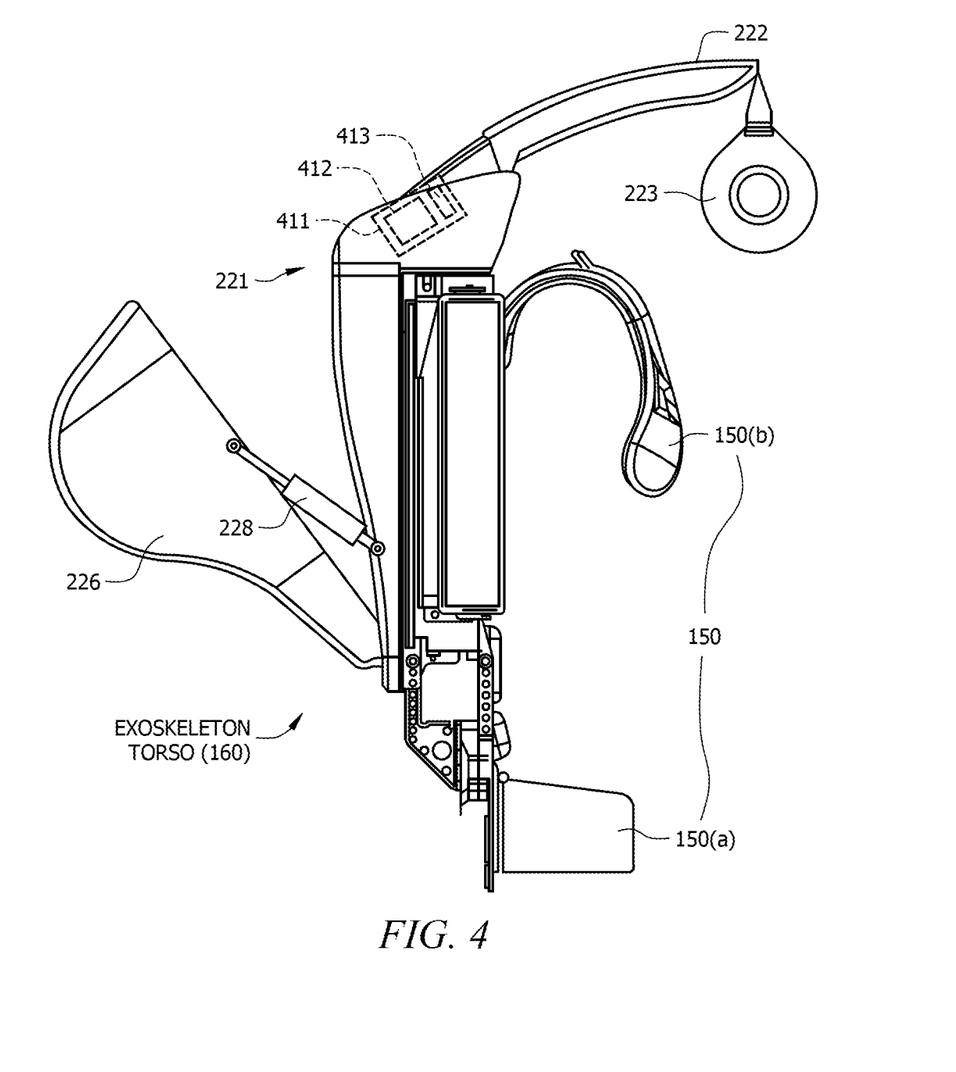
FIG. 4 depicts the counterweight moved farther aft of the user in order to balance the load (at least partially) about the hip flexion-extension axes, which is useful in situations when loads in front of the user (on the end effectors) are high, according to a disclosed embodiment.

The load lifting mechanism 221 can also include a movable counter weight 226 which may be rotated about counter weight rotation axis 227 (see FIG. 3) by a counterweight actuator 228 (see FIG. 4). One advantageous aspect of this feature is to make the mass of the counterweight 228 include the mass of the winch 229 (including its motor, indicated by the "M" in FIG. 3). This can be done by routing the lifting strap or cable 222 through the path shown in FIG. 3. The strap or cable 222 passes over a pulley 236 which is concentric with the counter weight rotation axis 227 and therefore the motion of the counterweight 228 has very little affect on the length (or load) of the lifting strap or cable 222.

In one embodiment the motor can comprise a hydraulic motor. Hydraulic motor-based architectures can be highly energy efficient to help support battery powered operation of disclosed systems including the portable load lifting assist system 100 shown in FIG. 1.

In operation of the load lifting mechanism 221, when loads in front of the user (on the end effectors 223) are high, the counterweight 226 is moved farther aft of the user in order to balance the load (at least partially) about the hip flexion-extension axes 151 and 152. This is shown occurring in FIG. 4. This may be accomplished by using a controller 411 such as comprising a microprocessor (or microcomputer) 412 coupled to a force sensor 413 shown in FIG. 4 which measures the force being applied by load lifting mechanism 221 to the lifting strap or cable 222.

The controller 411 can then send a control signal that triggers movement of the movable counter weight 226 to a position appropriate to balance the moment created about hip flexion-extension axes 151 and 152 by the counter weight 226 with the moment created by the down force on the cables 222 due to the load in front of the user. One having ordinary skill in the art will note that there are many ways to measure the force in cables 222 and approximate the moment created by that force about hip flexion-extension axes 151 and 152. If this estimate were reasonable accurate and the net moment on the exoskeleton trunk 109 about hip flexion-extension axes 151 and 152 were to be near zero, the need for hip torque generators 145 and 146 may be greatly reduced or even eliminated because the wearer of the exoskeleton torso 160 can provide the small amount of remaining torque needed to the keep the exoskeleton trunk 109 upright.

One having ordinary skill in the art can construct a movable counter weight 226 which translated linearly or swung on a linkage type mechanism in a manner that would not be a rotation about a counter weight rotation axis 227. Any mechanism which will move the counterweight farther behind (or closer to) the hip flexion-extension axes 151 and 152 will generally be able to produce the desired effect.

FIG. 3 depicts a partial cross section depiction of an exemplary load lifting bar mechanism 230 associated with exoskeleton torso 160, according to a disclosed embodiment. The load lifting bar mechanism 230 includes a lifting bar 225, lifting bar guide 231, and cam plate 232. The lifting bar 225 slides over the lifting bar guide 231 in a telescopic fashion.

Figure 5:
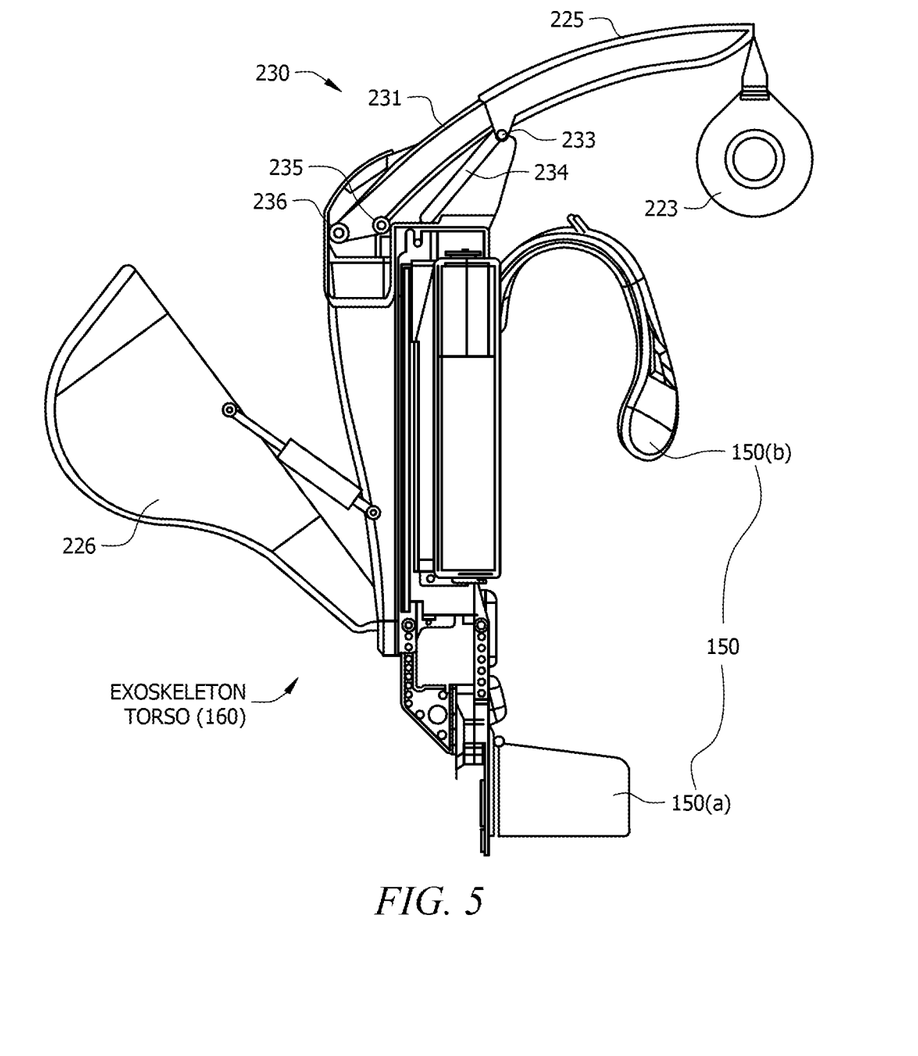
FIG. 5 depicts the position of lifting bar along the lifting bar guide being determined by the cam roller which is mounted on the lifting bar and moves in a slot on cam plate, wherein the lifting bar guide pivots on the pivot, and the pulley is a pulley over which the strap runs, according to a disclosed embodiment.

Referring to FIG. 5, the position of lifting bar 225 along the lifting bar guide 231 is determined by the cam roller 233 which is mounted on the lifting bar 225 and moves in a slot 234 on cam plate 232. The lifting bar guide 231 pivots on the pivot 235. Pulley 236 is a pulley over which the strap or cable 222 runs. When enough of the strap or cable 222 is retrieved such that the end effectors 223 are approaching the ends of the lifting bar 225, the lifting bar 225 starts to move upward and outward as the cam roller 233 moves upward in the slot 234 on cam plate 232.

Figure 6:
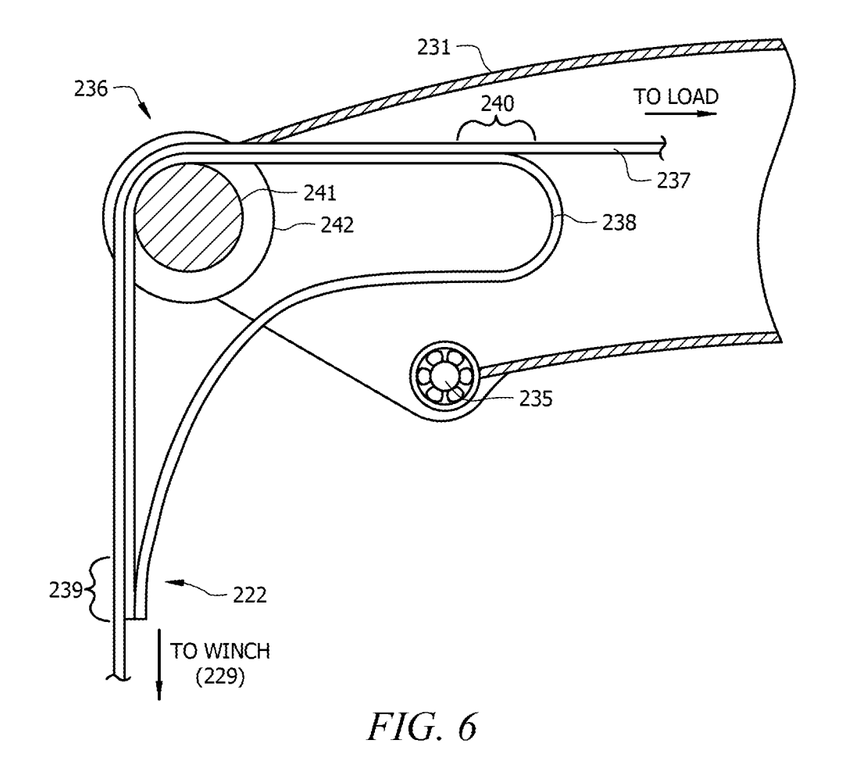
FIG. 6 is a close up view of the rear end of an example lifting bar guide, according to a disclosed embodiment.

To understand how the strap or cable 222 causes the lifting bar 225 to move upward and outward, FIG. 6 shows a close up view of the rear end of the lifting bar guide 231. In FIG. 6, it can be seen that the lifting strap 222 is actually comprised of two parts, the main lifting strap 237 and the lifting strap loop 238. The main strap 237 and the strap loop 238 are attached (e.g., sewn or bonded) together in the regions 239 and 240. Also, it can be seen that the pulley 236 comprises a body 241 and flanges 242. When the strap or cable 222 is pulled towards the winch 229, eventually the lifting strap loop 238 will wrap around the pulley body 241 and begin pulling downward on the pulley body. This will cause the lifting bar guide 231 to pivot on the pivot 235 which will cause the lifting bar 225 to move upward and outward. The strap loop 238 encounters the pulley body 241 at a point where there is still strap available between the end of the lifting bar 225 and the end effector 223. If there were no strap available, the lifting bar 225 could not extend along the lifting bar guide 231 because it would be constrained by the strap or cable 222.

One having ordinary skill in the art will note that there are many ways to construct a load lifting bar mechanism 230 which solely by pulling on a strap or a cable, the lifting bars will move upward and outward when the strap or cable is near the end of its travel. This allows the wearer of exoskeleton torso 160 to lift loads up to much higher heights than retracted lifting bars would allow.

In other disclosed embodiments, the portable load lifting assist system is not attached to a lower extremity exoskeleton 120 as described above relative to FIGS. 1-6. For example, the portable load lifting assist system can comprise only exoskeleton torso 160 which can be worn by a user analogous to a backpack.

Figure 7:
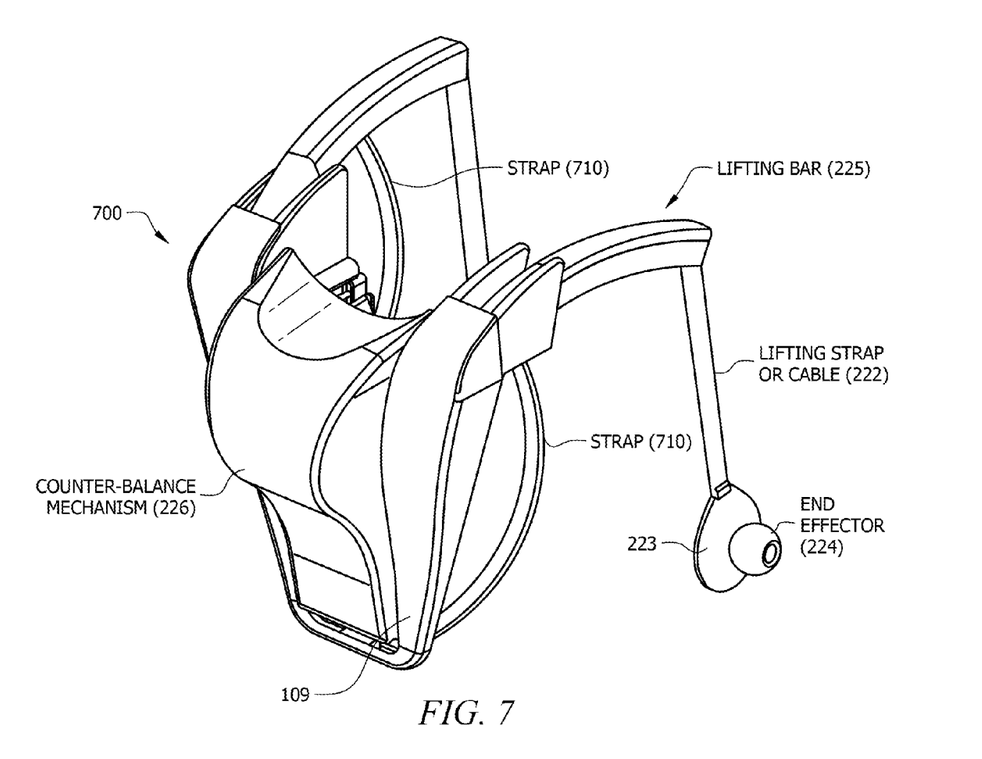
FIG. 7 shows a depiction of an example portable load lifting assist system that includes lifting straps that allow the portable load lifting assist system to be worn like a backpack, according to another disclosed embodiment.

FIG. 7 shows a depiction of an exemplary portable load lifting assist system 700 that includes straps 710 that allows the portable load lifting assist system 700 comprising exoskeleton trunk 109 to be worn by a user like a backpack. The movable counter weight 226 is identified in FIG. 7 by its function "counter-balance mechanism".

Figure 8:
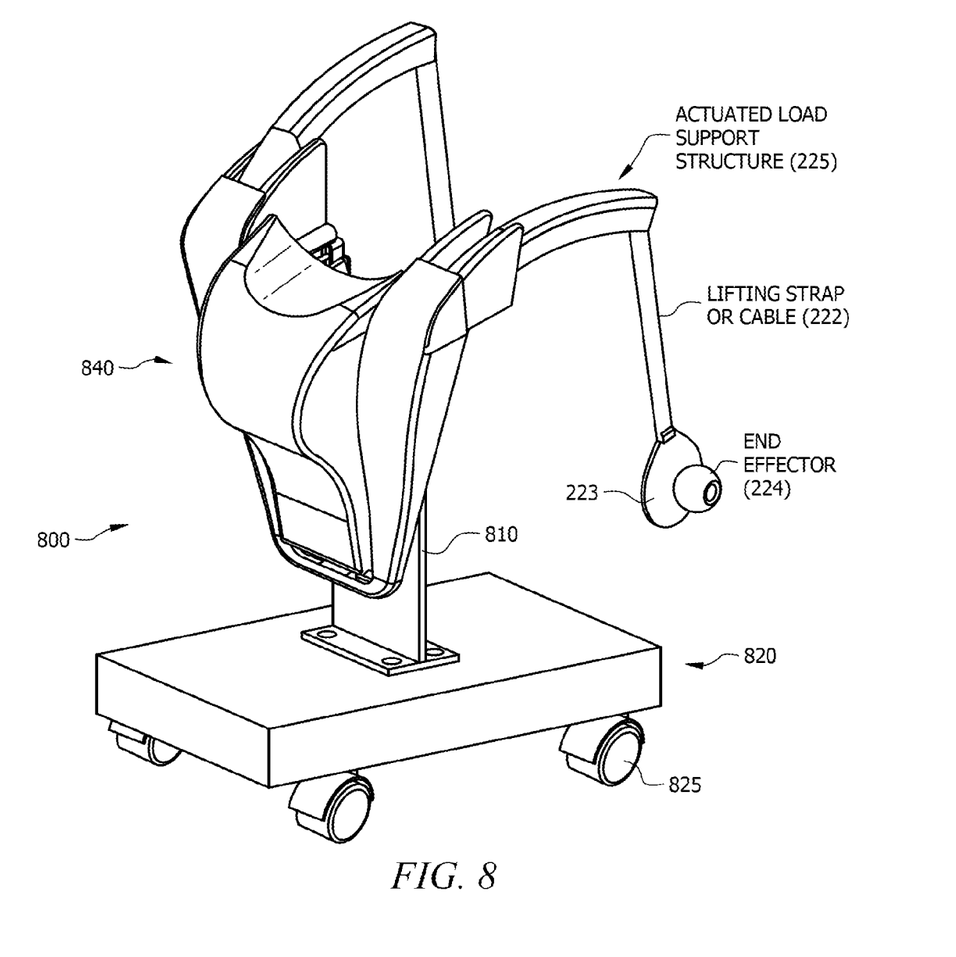
FIG. 8 shows an example portable load lifting system that comprises a cart including wheels that mounts the load lifting mechanism on a support structure that is secured to the cart, according to another disclosed embodiment.

In yet another embodiment, the portable load lifting system can be attached to a mobile unit. FIG. 8 shows an exemplary portable load lifting system 800 that comprises a cart 820 including wheels 825 that mounts an example load lifting system 840 on a movable support structure 810 (e.g., bolted or welded) that is secured to the cart 820. The movable support structure 810 has mobility via the cart 820. Portable load lifting system 800 as well as disclosed portable load lifting assist systems can be used to support a variety of applications, including military, industrial and medical applications. assist soldiers during combat.

Advantages of disclosed portable load lifting systems include simplicity of actuation and flexibility to relocate to alternate work or other areas. Unlike a fully articulated arm, disclosed embodiments can use minimal sensing and actuation capability. This reduces the cost and power requirements and improves the reliability of the design as compared to an actuated arm. Also, unlike known fixed load attachment, load lifting systems disclosed herein allow for the raising and lowering of the load. For example, a user such as a soldier using a disclosed portable lifting assist system can raise a load above his or her shoulders, as well as lower the load to the ground.

Moreover, unlike known overhead lift devices integrated and thus fixed into the building infrastructure, portable load lifting systems disclosed herein have significantly enhanced flexibility in its usage. Because disclosed load lifting systems are not physically restrained to a work area, a user can operate the load lifting system inside a warehouse one minute, then head directly outside and continue to operate the load lifting system. This provides much greater utility to the user at lower cost and with lower power consumption.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

I claim:

1. A portable load lifting system, comprising:
   a movable support structure;
   a movable counter weight rotatably secured to said movable support structure about a counter weight rotation axis, the movable counter weight comprising:
     a counter weight actuator configured to rotate the movable counter weight about the counter weight rotation axis; and
     a winch comprising a motor driven reel mechanism; and
   a pair of lifting straps connected to the motor driven reel mechanism of the winch at a first end, each lifting strap comprising:
     an end effector configured to contact a load; and
     a handle attached to an outside surface of the end effector;
   wherein the motor driven reel mechanism is configured to reel the pair of lifting straps such that the pair of lifting straps lift the load when the end effectors contact the load.

2. The system of claim 1, wherein said movable support structure comprises an exoskeleton torso comprising:
   an exoskeleton trunk; and
   an upper body interface device configured to couple the exoskeleton trunk to an upper body of a user.

3. The system of claim 2, wherein said upper body interface device comprises one of the group consisting of: a vest, a belt, shoulder straps, chest straps, a body cast, harness, and a waist belt.

4. The system of claim 1, wherein each handle comprises a force sensor, each force sensor configured to measure a load force applied to the handle corresponding to the force sensor.

5. The system of claim 1, further comprising a lifting bar coupled to the movable support structure, the lifting bar configured to guide the lifting straps between a front and a rear of the movable support structure.

6. The system of claim 1, further comprising a processor-based controller and a force sensor configured to measure a force applied by said winch to said lifting straps or cables,
   wherein said controller is operable to send a control signal configured to instruct the controller to rotate said movable counter weight about the counter weight rotation axis to a position appropriate to balance a moment created by the counter weight with respect to a hip flexion extension axis of a user with a moment created by a down force on said lifting straps with respect to the hip flexion extension axis of the user.

7. The system of claim 1, further comprising a load lifting bar mechanism comprising a pair of lifting bars, each lifting bar movably coupled to the movable support structure, each lifting bar configured to guide a respective lifting strap between a front and a rear of the movable support structure,
   wherein each lifting strap is configured to move an end of the respective lifting bar upwardly and outwardly away from the movable support structure in response to the motor driven reel mechanism reeling the lifting strap such that the respective effector is within a predetermined distance of the end of the lifting bar.

8. The system of claim 7, wherein the load lifting bar mechanism further comprises:
   a pair of lifting bar guides each coupled between the respective lifting bar and movable support structure, wherein the lifting bar is telescopically movable with respect to the lifting bar guide and the lifting bar guide is pivotally secured to the movable support structure about a pivot;
   a pair of cam plates secured to the movable support structure, each cam plate comprising a slot;
   a pair of cam rollers, each cam roller connected to a respective lifting bar, each cam roller configured to move in the slot of the respective cam plate in response to pivoting the lifting bar guide such that the lifting bar telescopes upwardly and outwardly away from the movable support structure;
   a pair of pulleys, each pulley connected to a respective lifting bar guide, each pulley configured to receive and guide the respective lifting strap,
   wherein each lifting strap further comprises a lifting strap loop configured to engage the pulley in response to the motor driven reel mechanism reeling the lifting strap such that the respective effector is within a predetermined distance of the end of the lifting bar, thereby causing the pulley to pivot the lifting bar guide about the pivot and causing the cam roller to telescope the lifting bar upwardly and outwardly away from the movable support structure.

9. The system of claim 1, further comprising a mobile unit, wherein said movable support structure is mounted on the mobile unit.

10. The system of claim 9, wherein said mobile unit includes wheels.

11. The system of claim 1, further comprising a lower extremity exoskeleton configured to be coupled to a user's lower limbs,
   wherein said movable support structure comprises an exoskeleton torso including an exoskeleton trunk that is configured to be coupled to an upper body of said user through an upper body interface device that is coupled to said lower extremity exoskeleton.

12. The system of claim 11, wherein said lower extremity exoskeleton comprises leg supports, and said exoskeleton trunk is rotatably connectable to said leg supports at hip flexion-extension joints for hip flexion and extension rotations of leg supports about hip flexion-extension axes.

13. The system of claim 1, wherein said motor driven reel mechanism comprises a hydraulic motor.

14. A portable load lifting assist system, comprising:
   a movable support structure comprising an exoskeleton torso including an exoskeleton trunk that is configured to be coupled to a user's upper body;
   a movable counter weight rotatably secured to said movable support structure about a counter weight rotation axis, the movable counter weight comprising:

a counter weight actuator configured to rotate the movable counter weight about the counter weight rotation axis; and a winch comprising a motor driven reel mechanism;

a pair of lifting straps connected to the motor driven reel mechanism of the winch at a first end, each lifting strap comprising:

an end effector configured to contact a load; and a handle attached to an outside surface of the end effector;

wherein the motor driven reel mechanism is configured to reel the pair of lifting straps such that the pair of lifting straps lift the load when the end effectors contact the load; and a lower extremity exoskeleton configured to be coupled to the user's lower limbs, wherein said exoskeleton trunk couples to an upper body of said user through an upper body interface device that is coupled to said lower extremity exoskeleton.

15. The system of claim 14, wherein each handle comprises a force sensor, each force sensor configured to measure a load force applied to the handle corresponding to the force sensor.

16. The system of claim 14, further comprising a processor-based controller and a force sensor configured to measure a force applied by said winch to said lifting straps or cables, wherein said controller is operable to send a control signal configured to instruct the controller to rotate said movable counter weight about the counter weight rotation axis to a position appropriate to approximately balance a moment created by said counter weight with respect to a hip flexion extension axis of a user with a moment created by a down force on said lifting straps with respect to the hip flexion extension axis of the user.

17. The system of claim 14, further comprising a load lifting bar mechanism comprising a pair of lifting bars, each lifting bar movably coupled to the movable support structure, each lifting bar configured to guide a respective lifting strap between a front and a rear of the movable support structure, wherein each lifting strap is configured to move an end of the respective lifting bar upwardly and outwardly away from the movable support structure in response to the motor driven reel mechanism reeling the lifting strap such that the respective effector is within a predetermined distance of the end of the lifting bar.

18. The system of claim 17, wherein the load lifting bar mechanism further comprises:

a pair of lifting bar guides each coupled between the respective lifting bar and movable support structure, wherein the lifting bar is telescopically movable with respect to the lifting bar guide and the lifting bar guide is pivotally secured to the movable support structure about a pivot;

a pair of cam plates secured to the movable support structure, each cam plate comprising a slot;

a pair of cam rollers, each cam roller connected to a respective lifting bar, each cam roller configured to move in the slot of the respective cam plate in response to pivoting the lifting bar guide such that the lifting bar telescopes upwardly and outwardly away from the movable support structure; and a pair of pulleys, each pulley connected to a respective lifting bar guide, each pulley configured to receive and guide the respective lifting strap, wherein each lifting strap further comprises a lifting strap loop configured to engage the pulley in response to the motor driven reel mechanism reeling the lifting strap such that the respective effector is within a predetermined distance of the end of the lifting bar, thereby causing the pulley to pivot the lifting bar guide about the pivot and causing the cam roller to telescope the lifting bar upwardly and outwardly away from the movable support structure.

19. The system of claim 18, wherein said lower extremity exoskeleton comprises leg supports, and said exoskeleton trunk is rotatably connectable to said leg supports at hip flexion-extension joints for hip flexion and extension rotations of leg supports about hip flexion-extension axes.

20. A portable load lifting system, comprising:

a movable support structure;

a winch comprising a motor driven reel mechanism, the winch secured to the movable support structure;

a pair of lifting straps connected to the motor driven reel mechanism of the winch at a first end, each lifting strap comprising:

an end effector configured to contact a load; and a handle attached to an outside surface of the end effector;

wherein the motor driven reel mechanism is configured to reel the pair of lifting straps such that the pair of lifting straps lift the load when the end effectors contact the load; and a load lifting bar mechanism comprising a pair of lifting bars, each lifting bar movably coupled to the movable support structure, each lifting bar configured to guide a respective lifting strap between a front and a rear of the movable support structure, wherein each lifting strap is configured to move an end of the respective lifting bar upwardly and outwardly away from the movable support structure in response to the motor driven reel mechanism reeling the lifting strap such that the respective effector is within a predetermined distance of the end of the lifting bar.

21. The system of claim 20, wherein the load lifting bar mechanism further comprises:

a pair of lifting bar guides each coupled between the respective lifting bar and movable support structure, wherein the lifting bar is telescopically movable with respect to the lifting bar guide and the lifting bar guide is pivotally secured to the movable support structure about a pivot;

a pair of cam plates secured to the movable support structure, each cam plate comprising a slot;

a pair of cam rollers, each cam roller connected to a respective lifting bar, each cam roller configured to move in the slot of the respective cam plate in response to pivoting the lifting bar guide such that the lifting bar telescopes upwardly and outwardly away from the movable support structure; and a pair of pulleys, each pulley connected to a respective lifting bar guide, each pulley configured to receive and guide the respective lifting strap, wherein each lifting strap further comprises a lifting strap loop configured to engage the pulley in response to the motor driven reel mechanism reeling the lifting strap such that the respective effector is within a predetermined distance of the end of the lifting bar, thereby causing the pulley to pivot the lifting bar guide about the pivot and causing the cam roller to telescope the lifting bar upwardly and outwardly away from the movable support structure.

* * * * *